(12) United States Patent
Kiuchi

(10) Patent No.: US 7,810,593 B2
(45) Date of Patent: Oct. 12, 2010

(54) CONTROL SYSTEM FOR A HYBRID ELECTRIC VEHICLE

(75) Inventor: Tatsuo Kiuchi, Kanagawa (JP)

(73) Assignee: Mitsubishi Fuso Truck and Bus Corporation, Kawasaki-shi, Kanagawa (JP)

( * ) Notice: Subject to any disclaimer, the term of this patent is extended or adjusted under 35 U.S.C. 154(b) by 740 days.

(21) Appl. No.: 11/706,350

(22) Filed: Feb. 15, 2007

(65) Prior Publication Data

US 2007/0187161 A1    Aug. 16, 2007

(30) Foreign Application Priority Data

Feb. 15, 2006    (JP) ............................. 2006-037897

(51) Int. Cl.
    *B60W 20/00*    (2006.01)
(52) U.S. Cl. .................................. 180/65.285; 903/930
(58) Field of Classification Search ............ 180/65.265, 180/65.275, 65.285, 65.29; 903/930
    See application file for complete search history.

(56) References Cited

U.S. PATENT DOCUMENTS

| 4,335,429 | A | * | 6/1982 | Kawakatsu | ................. 701/102 |
|---|---|---|---|---|---|
| 5,176,213 | A | * | 1/1993 | Kawai et al. | ................. 180/243 |
| 5,713,814 | A | * | 2/1998 | Hara et al. | ...................... 477/5 |
| 5,806,617 | A | * | 9/1998 | Yamaguchi | ............ 180/65.235 |
| 6,054,844 | A | * | 4/2000 | Frank | ........................... 322/16 |
| 6,116,363 | A | * | 9/2000 | Frank | ...................... 180/65.25 |
| 6,223,106 | B1 |  | 4/2001 | Yano et al. | |
| 6,366,059 | B1 | * | 4/2002 | Wakashiro et al. | ............ 322/16 |
| 6,504,327 | B2 |  | 1/2003 | Omata et al. | |
| 6,580,977 | B2 | * | 6/2003 | Ding et al. | ...................... 701/22 |
| 6,595,895 | B2 | * | 7/2003 | Suzuki et al. | .................. 477/3 |
| 2004/0049328 | A1 | * | 3/2004 | Lee | ............................ 701/22 |

FOREIGN PATENT DOCUMENTS

| DE | 199 23 277 A1 | 12/1999 |
|---|---|---|
| DE | 101 16 314 A1 | 11/2001 |
| DE | 101 63 382 A1 | 7/2002 |
| JP | 05-176405 | 7/1993 |

* cited by examiner

*Primary Examiner*—Frank B Vanaman
(74) *Attorney, Agent, or Firm*—Jacobson Holman PLLC

(57) ABSTRACT

In a control system for a hybrid electric vehicle equipped with an engine and an electric motor, when it is judged that the vehicle is in a preset state where torque required in the electric motor is zero, storage-rate retention control is carried out by causing the electric motor to generate minute torque having an absolute value smaller than the torque of the electric motor, which is required for a forced charge or discharge.

6 Claims, 5 Drawing Sheets

CONTROL SYSTEM FOR A HYBRID ELECTRIC VEHICLE

BACKGROUND OF THE INVENTION

1. Field of the Invention

The present invention relates to a control system for a hybrid electric vehicle equipped with an engine and a motor.

2. Description of the Related Art

A hybrid electric vehicle equipped with an engine and an electric motor and capable of transmitting the driving force of the engine and that of the electric motor to the driving wheels of the vehicle has conventionally been developed and in practical use.

As one example of such a hybrid electric vehicle, a hybrid electric vehicle is proposed, for example, in Unexamined Japanese Patent Publication No. 5-176405 (hereinafter, referred to as Document 1), in which the rotary shaft of the electric motor is coupled between the output shaft of the clutch that connects/disconnects the driving force transmitted from the engine to the transmission and the input shaft of the transmission.

At the startup of the hybrid electric vehicle as disclosed in Document 1, the clutch is disengaged, and the electric motor is operated as a motor by power supply from the battery to start the vehicle only by the driving force of the electric motor. During the running of the vehicle after startup, the clutch is engaged, so that the driving force of the engine is transmitted through the transmission to the driving wheels.

While the vehicle is driven by the driving force of the engine, the torque required for the running of the vehicle is properly distributed to the engine and the electric motor, and the electric motor is operated as a motor so as to supplement the driving force. At the deceleration of the vehicle, the electric motor is operated as a generator to create a regenerative braking force, and the braking energy is converted to electric power to charge the battery.

In the hybrid electric vehicle thus constructed, if the storage rate (hereinafter, referred to as SOC) of the battery is reduced too low, in order to prevent the overdischarge of the battery, the battery is forcibly charged by operating the electric motor as a generator to recover the SOC. Contrary to this, if the SOC is raised too high, in order to prevent the overcharge of the battery, the electric motor is operated as a motor, and the torque distribution to the electric motor is increased. By so doing, the battery is forcibly discharged, and the SOC is reduced to a proper value.

Occasionally, in the hybrid electric vehicle thus constructed, the driving and braking forces produced by the electric motor are not required depending upon the operating state of the vehicle, such as during idle operation of the engine or during constant-speed driving. In that case, the electric motor is controlled so that the motor torque becomes zero, that is, so that the electric motor does not create the driving and braking forces at all.

However, in the situation where a synchronous motor is used as an electric motor, for example, even if the electric motor is controlled so that the motor torque becomes zero, the control accuracy of the electric motor cannot be sufficiently secured due to the properties of the electric motor. Therefore, it is difficult to maintain the torque to precisely zero, and very small amount of current flows between the battery and the electric motor.

Accordingly, if the control for controlling the motor torque to become zero, such as the idle operation of the engine and constant-speed driving, is continued for a long period of time, very small amount of current continuously flows between the battery and the electric motor. As a result, the SOC of the battery is reduced or increased by degree. If the SOC of the battery is excessively reduced or increased, in order to prevent the overdischarge or overcharge of the battery, a forced charge or discharge is carried out as already stated.

Consequently, in spite that the vehicle is in the state where the motor torque is not basically required, the kinetic energy of the electric motor and the electric energy of the battery are uselessly consumed since the current flows between the electric motor and the battery. Furthermore, the forced charge and discharge hamper the proper torque distribution between the engine and the electric motor, and degrade the operating efficiency of the engine. Moreover, during the forced charge and discharge, engine power is converted to electric energy, and the electric energy is consumed more than required. This also deteriorates energy efficiency and then lowers fuel economy.

SUMMARY OF THE INVENTION

An aspect of the present invention is directed to a control system for a hybrid electric vehicle equipped with an engine and an electric motor, comprising a battery that supplies power to the electric motor when the electric motor is operated as a motor and can be charged with power generated by the electric motor when the electric motor is operated as a generator; storage-rate detection means for detecting a storage rate of the battery; motor judgment means for making a judgment as to whether the vehicle is in a preset state where torque required in the electric motor is zero; and storage-rate control means for implementing storage-rate retention control for retaining the storage rate of the battery, the control in which the storage-rate control means controls the electric motor to perform a forced charge or discharge of the battery when the storage rate of the battery, which is detected by the storage-rate detection means, is out of a predetermined allowable range, and causes the electric motor to generate minute torque having an absolute value smaller than the torque of the electric motor, which is required for the forced charge or discharge, when the motor judgment means judges that the vehicle is in the preset state.

BRIEF DESCRIPTION OF THE DRAWINGS

The present invention will become more fully understood from the detailed description given hereinafter and the accompanying drawings which are given by way of illustration only, and thus, are not limitative of the present invention, and wherein.

DETAILED DESCRIPTION OF THE INVENTION

An embodiment of the present invention will be described below with reference to the attached drawings.

Figure 1:
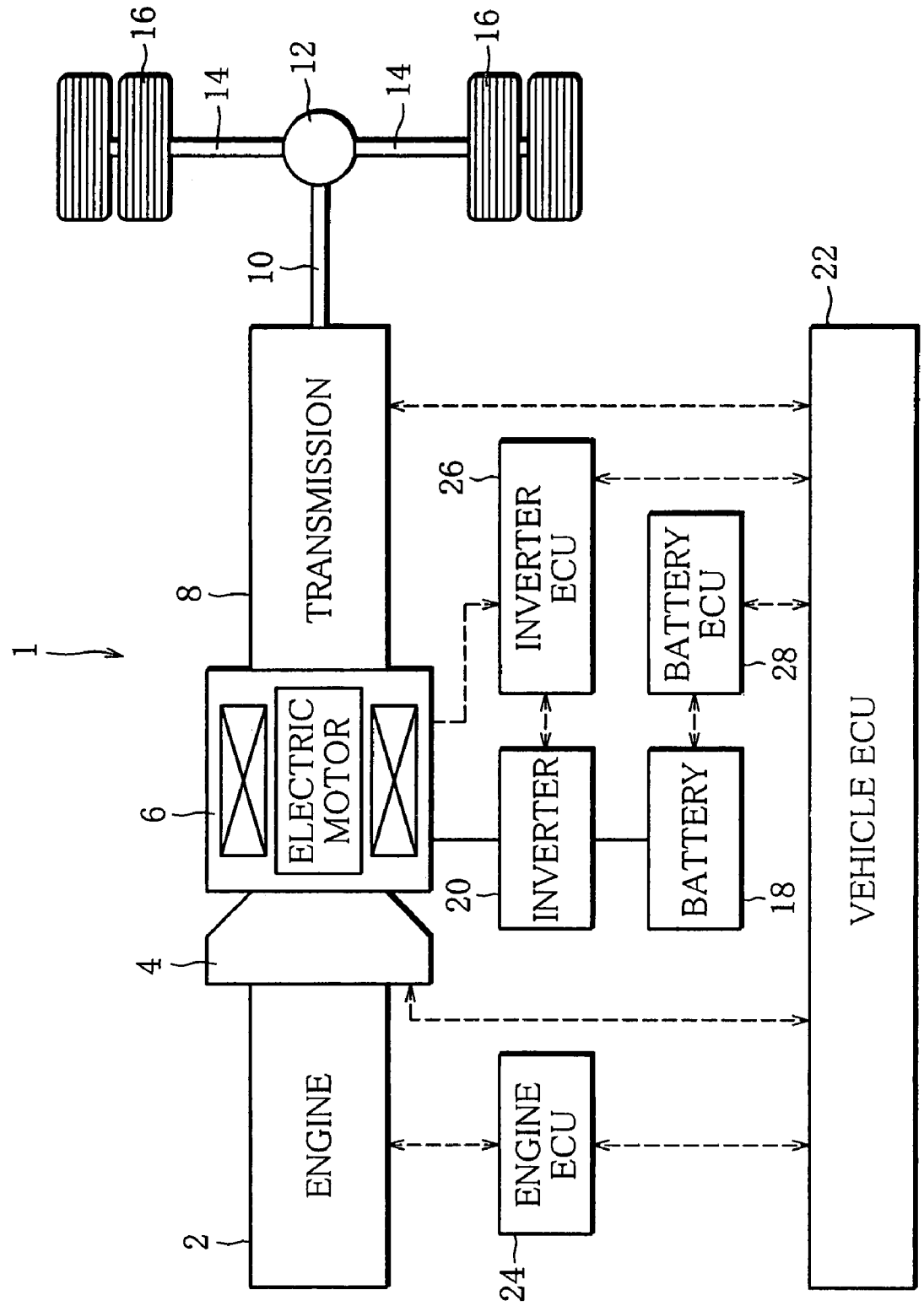
FIG. 1 is a construction view of a substantial part of a hybrid electric vehicle having a control system according to one embodiment of the present invention.

FIG. 1 is a construction view of a substantial part of a hybrid electric vehicle 1 to which the present invention is applied. An input shaft of a clutch 4 is coupled to an output shaft of an engine 2 that is a diesel engine. An output shaft of the clutch 4 is coupled to an input shaft of an automatic transmission (hereinafter, referred to as transmission) 8 through a rotary shaft of a permanent-magnetic synchronous motor (hereinafter, referred to as electric motor) 6. An output shaft of the transmission 8 is connected to right and left driving wheels 16 through a propeller shaft 10, a differential gear 12 and driving shafts 14.

When the clutch 4 is engaged, both the output shaft of the engine 2 and the rotary shaft of the electric motor 6 are mechanically coupled to the driving wheels 16. When the clutch 4 is disengaged, only the rotary shaft of the electric motor 6 is mechanically coupled to the driving wheels 16.

The electric motor 6 is operated as a motor when DC power stored in a battery 18 is supplied to the electric motor 6 after being converted to AC power by an inverter 20. A driving force of the electric motor 6 is transmitted to the driving wheels 16 after being shifted to proper speed by the transmission 8. At the time of deceleration of a vehicle, the electric motor 6 is operated as a generator. Kinetic energy created by rotation of the driving wheels 16 is transmitted to the electric motor 6 through the transmission 8 to be converted to AC power, thereby producing a regenerative braking force. This AC power is converted to DC power by the inverter 20 and is then charged to the battery 18. In this manner, the kinetic energy created by the rotation of the driving wheels 16 is recovered as electric energy.

A driving force of the engine 2 is transmitted to the transmission 8 through the rotary shaft of the electric motor 6 while the clutch 4 is engaged. After being shifted to proper speed, the driving force of the engine 2 is transmitted to the driving wheels 16. Accordingly, if the electric motor 6 is operated as a motor while the driving force of the engine 2 is transmitted to the driving wheels 16, both the driving force of the engine 2 and that of the electric motor 6 are transmitted to the driving wheels 16. In other words, a part of driving torque to be transmitted to the driving wheels 16 to drive the vehicle is supplied from the engine 2, and at the same time, the rest of the driving torque is supplied from the electric motor 6.

If a storage rate (hereinafter, referred to as SOC) of the battery 18 is lowered, and the battery 18 then needs to be charged, the electric motor 6 is operated as a generator. Moreover, the electric motor 6 is driven by using a part of the driving force of the engine 2, to thereby carry out power generation. As described above, the generated AC power is converted to DC power by the inverter 20, and the battery 18 is charged with this DC power.

A vehicle ECU 22 implements engagement/disengagement control of the clutch 4 and gear-ratio change control of the transmission 8 according to an operating state of the vehicle and of the engine 2, and information from an engine ECU 24, an inverter ECU 26 and a battery ECU 28, etc. The vehicle ECU 22 performs integrated control for properly controlling the engine 2 and the electric motor 6 according to state of the above-mentioned controls, and the various kinds of operating state, such as start, acceleration and deceleration of the vehicle. During the integrated control, the vehicle ECU 22 determines torque to be generated by the engine 2 and torque to be generated by the electric motor 6. In this connection, the torque to be generated by the electric motor 6 is a positive value when the electric motor 6 is operated as a motor, and is a negative value when the electric motor 6 is operated as a generator.

The engine ECU 24 carries out various kinds of controls required in the operation of the engine 2 per se, including start/stop control and idle control of the engine 2, regeneration control of an exhaust emission purifying device, not shown, and the like. The engine ECU 24 controls a fuel injection amount and injection timing of the engine 2 so that the engine 2 generates the torque required in the engine 2, which has been set by the vehicle ECU 22.

The inverter ECU (storage-rate control means) 26 controls the inverter 20 according to the torque to be generated by the electric motor 6, which has been set by the vehicle ECU 22, and thereby controls the operation of the electric motor 6 by operating the electric motor 6 as a motor or generator.

The battery ECU (storage-rate detection means) 28 detects temperature and voltage of the battery 18, current flowing between the inverter 20 and the battery 18, etc. The battery ECU 28 obtains the SOC of the battery 18 from these detection results, and transmits the obtained SOC to the vehicle ECU 22 together with the detection results.

A description below is an outline of control that is performed mainly by the vehicle ECU 22 to run the vehicle in the hybrid electric vehicle 1 constructed as stated above.

First, when the vehicle is at rest, the clutch 4 is disengaged, and the engine 2 is in an idle operation. When a driver steps on an accelerator pedal, not shown, the vehicle ECU 22 sets the torque of the electric motor 6, which is required to start the vehicle, namely positive torque, according to a stepping amount of the accelerator pedal. The inverter ECU 26 controls the inverter 20 according to the torque that has been set by the vehicle ECU 22, and DC power of the battery 18 is converted to AC power by the inverter 20 and supplied to the electric motor 6. By being supplied with the AC power, the electric motor 6 is operated as a motor to create a driving force. The driving force of the electric motor 6 is transmitted to the driving wheels 16 through the transmission 8, and the vehicle is started.

In this way, the vehicle is started simply by using the driving force of the electric motor 6, instead of using the engine 2 whose working efficiency is not great at the start of the vehicle. By so doing, the vehicle can be efficiently and smoothly started.

When rotation speed of the electric motor 6 is increased to the vicinity of idle revolution of the engine 2 after the vehicle is started, the vehicle ECU 22 engages the clutch 4. At this point of time, the vehicle ECU 22 properly divides the driving torque required for start acceleration of the vehicle and the subsequent running of the vehicle between the engine 2 and the electric motor 6. At the same time, the vehicle ECU 22 indicates to the engine ECU 24 the torque to be generated by the engine 2, and also indicates to the inverter ECU 26 the torque to be generated by the electric motor 6.

Upon receipt of these indications, the engine ECU 24 and the inverter ECU 26 control the engine 2 and the electric motor 6, respectively. As a result, the torque generated by the engine 2 and the torque generated by the electric motor 6 are transmitted to the driving wheels 16 through the transmission 8. The vehicle ECU 22 properly carries out switch control of the gear ratio of the transmission 8 according to the operating state of the vehicle. The vehicle ECU 22 commands the engine ECU 24 and the inverter ECU 26 to properly control the torque of the engine 2 and that of the electric motor 6 in response to the switching of the gear ratio.

In general, during the running of the vehicle, the torque of the engine 2 is set by the vehicle ECU 22 so that the operating state of the engine 2 is in a range where the engine 2 can be operated with high efficiency. The ECU 22 further sets the torque of the electric motor 6 so that a shortage of torque of the engine 2 with respect to the torque required for the running of the vehicle is made up by the torque of the electric motor 6.

Secondly, when the vehicle is decelerated to stop, the vehicle ECU 22 obtains a braking torque to be generated by the engine 2 and the electric motor 6, based upon the operating state of the vehicle. The vehicle ECU 22 divides the braking torque between the engine 2 and the electric motor 6. Furthermore, the vehicle ECU 22 indicates to the engine ECU 24 the braking torque to be generated by the engine 2, and also indicates to the inverter ECU 26 the braking torque to be generated by the electric motor 6, namely negative torque.

Upon receipt of these indications, the engine ECU 24 brings the engine 2 into a decelerating operation and generates an engine braking force, whereas the inverter ECU 26 controls the inverter 20 to activate the electric motor 6 as a generator. Due to the generator operation of the electric motor 6, the kinetic energy created by the rotation of the driving wheels 16 is transmitted to the electric motor 6 through the transmission 8 and is converted to AC power, and there generates a regenerative braking force that is created by the electric motor 6. The AC power obtained by the electric motor 6 is charged to the battery 18 after being converted to DC power by the inverter 20. The kinetic energy generated by the rotation of the driving wheels 16 is recovered as electric energy.

At this time, the vehicle ECU 22 properly carries out the switch control of the engagement/disengagement of the clutch 4 and the gear ratio of the transmission 8 in response to the deceleration of the vehicle. When the required braking force can be obtained only by the electric motor 6, or when the rotation speed of the electric motor 6 is decreased to the vicinity of the idle revolution of the engine 2, the vehicle ECU 22 disengages the clutch 4 and commands the engine ECU 24 to perform the idle operation of the engine 2. In a state where the clutch 4 is disengaged, only the regenerative braking force of the electric motor 6 acts on the driving wheels 16 with a braking force of a braking device, and the vehicle stops.

As described above, the battery 18 is charged by the regenerative braking of the electric motor 6 at the time of deceleration of the vehicle. However, if the electric motor 6 is frequently operated as a motor because of the operating state of the vehicle, the SOC is drastically reduced, which raises the possibility that the battery 18 is overdischarged.

In order to avoid such circumstances, the battery 18 is forcedly charged. To be more specific, if the SOC of the battery which is transmitted from the battery ECU 28 is reduced to, for example, less than 30 percent, the vehicle ECU 22 indicates to the inverter ECU 26 the negative torque that can be generated by the electric motor 6 according to the operating state of the vehicle. The negative torque indicated at this time can be set only if the torque that can be generated by the engine 2 is higher than the torque required for the running of the vehicle, and a surplus thereof is set as negative torque. Therefore, the vehicle ECU 22 commands the engine ECU 24 so that the engine 2 generates torque obtained by summing the torque required for the running and the torque required for power generation of the electric motor 6.

The inverter ECU 26 controls the electric motor 6 so as to generate the negative torque that has been set by the vehicle ECU 22, to thereby operate the electric motor 6 as a generator. The engine ECU 24 controls the engine 2 so that the engine 2 generates maximum torque that can be outputted at this point of time. As a result, a part of the torque generated by the engine 2 is used to drive the electric motor 6, and the rest of the torque is transmitted to the driving wheels 16 through the transmission 8 the electric motor 6 operated as a generator generates power by being driven by the engine 2 and produces AC power. The AC power produced by the electric motor 6 is converted to DC power by the inverter 20 and is charged to the battery 18. Consequently, the SOC of the battery 18 is recovered.

If the regenerative braking of the electric motor 6 is increased in frequency, the SOC of the battery 18 is considerably raised. As a result, there is a possibility of overcharge of the battery 18.

In order to prevent such circumstances, the battery 18 is forcedly discharged. More concretely, if the SOC of the battery which is transmitted from the battery ECU 28 exceeds, for example, 70 percent, the vehicle ECU 22 increases the torque to be generated by the electric motor 6 which is indicated to the inverter ECU 26, so that all or most of the torque required for the running of the vehicle may be provided by the motor operation of the electric motor 6. At this time, the vehicle ECU 22 reduces the torque of the engine 2 which is indicated to the engine ECU 24 along with the increase of the torque of the electric motor 6. If the torque of the engine 2 is not necessary, the vehicle ECU 22 disengages the clutch 4 in some cases.

The inverter ECU 26 controls the electric motor 6 for the motor operation so as to generate the torque that has been set by the vehicle ECU 22. All or most of the torque required for the running of the vehicle is supplied by the electric motor 6. Therefore, the DC power of the battery 18 is converted to AC power by the inverter 20 and is consumed by the electric motor 6. Consequently, the SOC of the battery 18 is reduced to a proper value.

If the SOC of the battery 18 is outside the predetermined allowable range of from 30 percent to 70 percent, the battery is forcedly discharged or charged, and the engine 2 and the electric motor 6 are controlled so that the SOC of the battery 18 falls in the predetermined allowable range.

As stated above, during the running of the vehicle, the vehicle ECU 22 properly sets the torque of the engine 2 and that of the electric motor 6 and indicates them to the engine ECU 24 and the inverter ECU 26, respectively. While the vehicle runs at constant speed, however, the engine 2 can be operated with high efficiency. Therefore, the vehicle is driven solely by the engine 2 without the torque generation of the electric motor 6. Likewise, when the vehicle is at rest, it is not necessary to make the electric motor 6 generate the torque.

If there is no necessity to generate the torque from the electric motor 6 as described, the vehicle ECU 22 commands the inverter ECU 26 to zero the torque of the electric motor 6. Accordingly, during the running of the vehicle, the electric motor 6 is rotated by the kinetic energy created by the rotation of the driving wheels 16 in a state operated as neither motor nor generator.

Upon receipt of the command from the vehicle ECU 22, the inverter ECU 26 controls the inverter 20 so that the torque of the electric motor 6 becomes zero. Especially if the electric motor 6 is a synchronous motor, it is difficult due to its properties to keep the torque of the electric motor 6 to precisely zero. There flows very small amount of current between the electric motor 6 and the battery 18.

If the foregoing state continues for long hours, the SOC of the battery 18 is gradually reduced or raised. Eventually, the necessity arises that the forced charge or discharge must be carried out. As the forced charge converts the kinetic energy produced by the engine 2 to electric energy, the energy efficiency is degraded. The forced discharge uses electric energy although the vehicle can be basically driven by the kinetic energy produced by the engine 2. This also degrades the energy efficiency.

Furthermore, if the SOC is raised or reduced so much that the forced charge or discharge must be performed, this adversely affects the life duration of the battery 18.

In this view, in case that the state where the torque of the electric motor 6 is maintained at zero for a long period of time, and this state is left as it is until the forced charge or discharge is performed, the energy efficiency is reduced to deteriorate fuel economy. Furthermore, it is feared that the life duration of the battery 18 is shortened.

According to the present embodiment, in order to avoid the above circumstances, if the vehicle is in the preset state where the torque required in the electric motor 6 is zero, the inverter ECU 26 ignores the torque command from the vehicle ECU 22 and performs SOC retention control (storage-rate retention control) for retaining the SOC of the battery 18.

Figure 2:
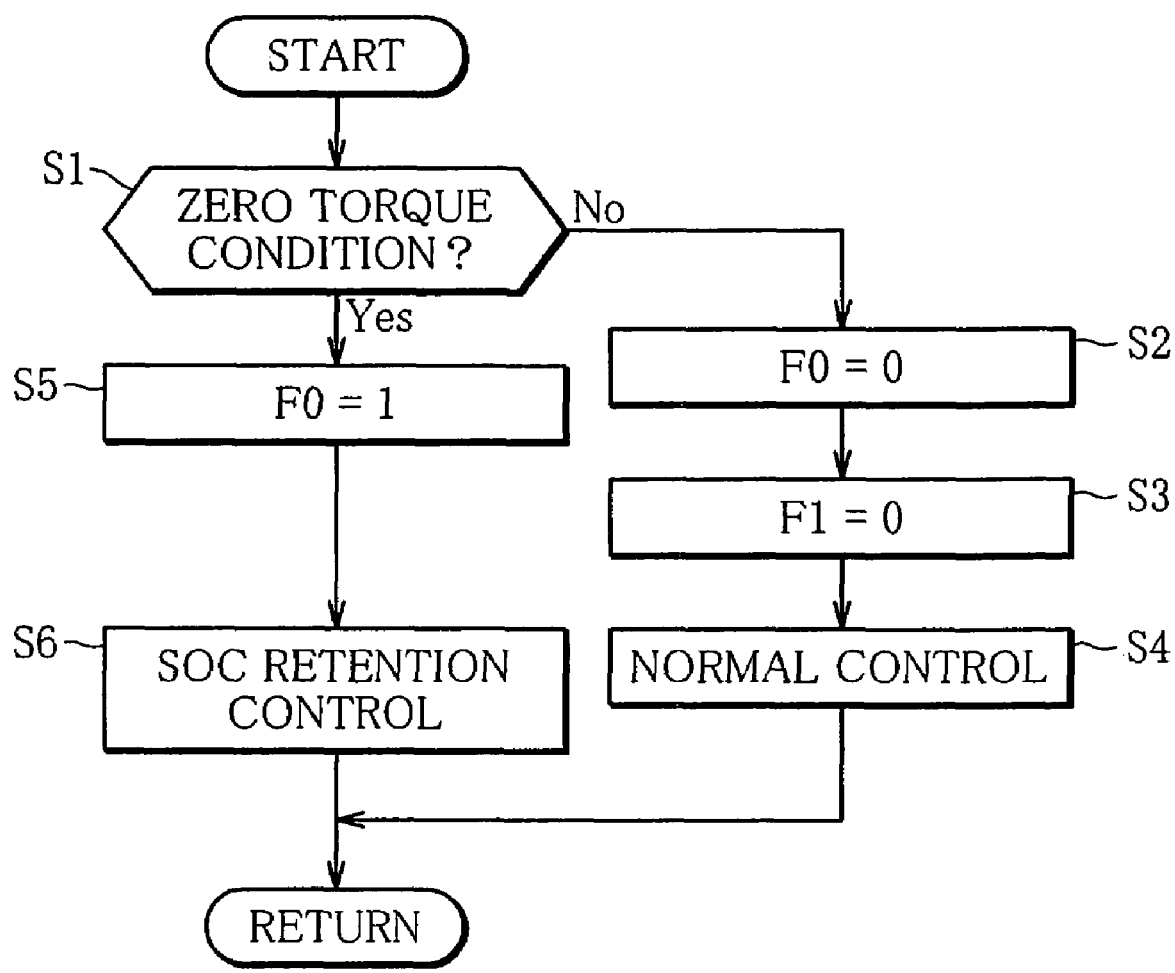
FIG. 2 is a flowchart showing an outline of control of an electric motor, which is implemented by an inverter ECU.

FIG. 2 is a flowchart showing the control of the electric motor 6 which is implemented by the inverter ECU 26, including the SOC retention control. The control of the electric motor 6 which is carried out through the flowchart is implemented in a predetermined control cycle.

In a first Step S1, a judgment is made as to whether the vehicle is in the preset state where the torque required in the electric motor 6 is zero (hereinafter, referred to as a zero torque condition) (motor judgment means). Concretely, when the torque of the electric motor 6, which has been set by the vehicle ECU 22, is zero, and the vehicle is in a preset operating state that has been predetermined as an operating state in which the electric motor 6 is not necessary, it is judged that the vehicle is in the preset state where the electric motor 6 is capable of carrying out the SOC retention control. The preset operating state is an operating state, such as constant-speed running state, which is not corresponding to any one of start, rapid acceleration, shift transmission and rapid deceleration.

It is not judged that the vehicle is in the zero torque condition only because the torque required in the electric motor 6 actually becomes zero. This is to deselect a case that the torque required in the electric motor 6 temporarily equals zero during a transitional period in which the operating state of the vehicle changes, including a case in which the electric motor 6 is switched from the motor operation to the generator operation and a reverse case. For this reason, the preset operating state is an operating state other than one in which the torque required in the motor temporarily equals zero in a transitional period.

If, in Step S1, it is judged that the vehicle is not in the zero torque condition where the torque required in the electric motor 6 is zero, the procedure advances to Step S2, in which a value of Flag F0 is set to zero. Flag F0 is a flag indicating whether the vehicle is in the zero torque condition at present. If the value of Flag F0 is 1, the vehicle is currently in the zero torque condition. Since the value of Flag F0 is zero here, the procedure moves to Step S3.

In Step S3, the value of Flag F1 is set to zero. When the value of Flag F1 is 1, Flag F1 indicates that the SOC of the battery 18 has been read from the vehicle ECU 22 when the SOC retention control described below is started. Since the SOC retention control is not carried out yet at this moment, the value of Flag F1 is set to zero.

The procedure proceeds to Step S4, in which the inverter ECU26 controls the inverter 20 according to the torque required in the electric motor 6, which has been set by the vehicle ECU 22, in the above-described manner. Thereby the inverter ECU 26 carries out the normal control for operating the electric motor 6 as a motor or generator, and the present control cycle is ended.

In the next control cycle, too, it is judged in Step S1 whether the vehicle is in the zero torque condition. As long as it is judged in Step S1 that vehicle is not in the zero torque condition, the inverter ECU 26 performs the normal control according to the torque required in the electric motor 6, which has been set by the vehicle ECU 22 in Step S4, after passing through Steps S2 and S3.

If, in Step S1, it is judged that the vehicle is in the zero torque condition, the procedure moves to Step S5, in which the value of Flag F0 is set to 1. The procedure further proceeds to Step S6. The inverter ECU 26 performs SOC retention control, and the control cycle is ended.

In the subsequent control cycles, too, as long as it is judged in Step S1 that the vehicle is in the zero torque condition, the procedure advances to Step S5 to S6, in which the SOC retention control is carried out. If the electric motor 6 and the vehicle come out of the zero torque condition, the procedure moves from Step S1 through Steps S2 and S3 to Step S4 again. Therefore, the inverter ECU 26 carries out the normal control according to the torque required in the electric motor 6, which has been set by the vehicle ECU 22.

Figure 3:
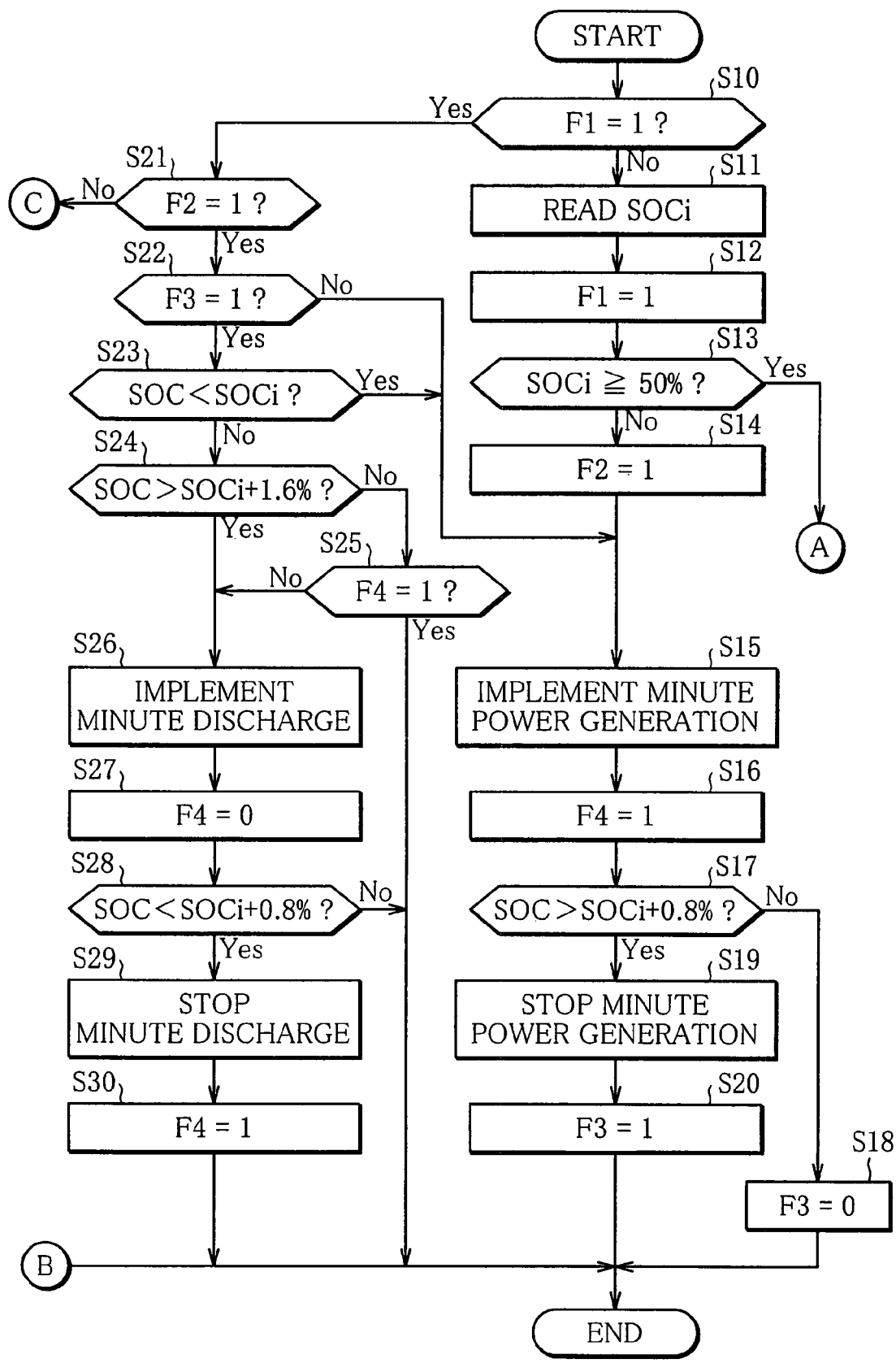
FIG. 3 is a flowchart showing a part of SOC retention control.
Figure 4:
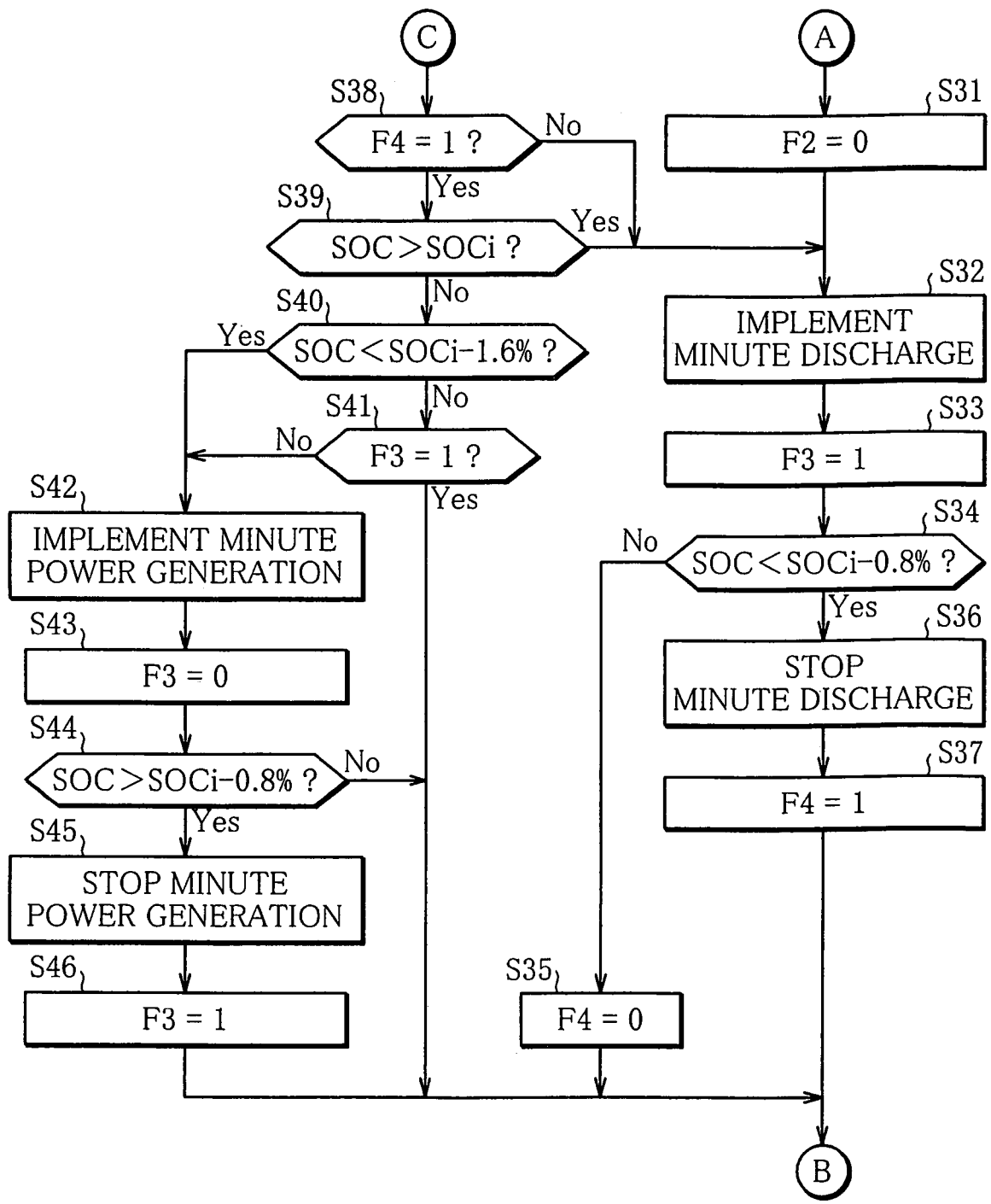
FIG. 4 is a flowchart showing the rest of the SOC retention control.

Details of the SOC retention control that is implemented in Step S6 is partially shown in FIG. 3, and the rest in FIG. 4.

Once the SOC retention control is started, a judgment is made as to whether the value of Flag F1 is 1 in Step S10 shown in FIG. 3. As mentioned above, since the value of Flag F1 remains zero until the SOC retention control is started, the procedure advances to Step S11 here.

In Step S11, the inverter ECU 26 reads from the vehicle ECU 22 the SOC of the battery 18 at the moment of being detected by the battery ECU 28 as SOCi. The procedure then moves to Step S12.

Since the SOC of the battery 18 is read in Step S11, the value of Flag F1 is set to 1 in Step S12. The procedure subsequently proceeds to Step S13.

In Step S13, it is judged whether the SOCi that has been read in Step S11, namely the SOC of the battery 18 at the time point when the SOC control is started, is 50 percent or more. The SOC of 50 percent is a medium value of the predetermined allowable range of from 30 percent to 70 percent in which the forced charge or discharge of the battery 18 is not required to be done. If the SOCi is less than 50 percent, the SOC of the battery 18 is relatively low. It is therefore determined to carry out the SOC retention control to charge the battery 18 by operating the electric motor 6 as a generator. The procedure then moves to Step S14. If the SOCi equals to or more than 50 percent, the SOC of the battery 18 is relatively high. Accordingly, it is determined to carry out the SOC retention control to discharge the battery 18 by operating the electric motor 6 as a motor. The procedure then advances to Step S31 shown in FIG. 4.

First, the following explanation is about the case in which the SOCi is less than 50 percent. The procedure moves to Step S14, and a value of Flag F2 is set to 1. Flag F2 indicates whether the SOCi is 50 percent or more. The value of zero indicates that the SOCi is 50 percent or more. Since the SOCi is less than 50 percent here, the value of Flag F2 is set to 1. The procedure then proceeds to Step S15.

In Step S15, the inverter ECU 26 sets negative minute torque for operating the electric motor 6 as a generator. The inverter ECU 26 controls the inverter 20 so that the electric motor 6 generates the minute torque, and causes the electric motor 6 to perform minute power generation.

Figure 5:
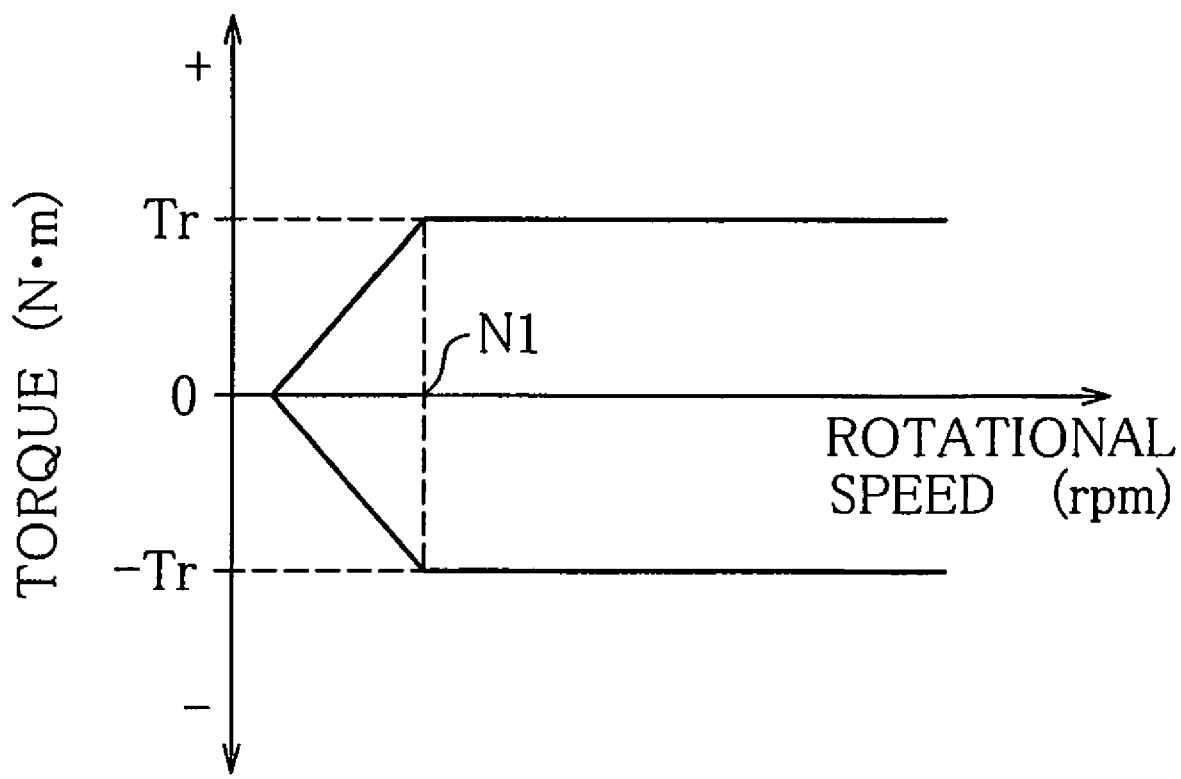
FIG. 5 is a view showing minute torque that is used in the SOC retention control.

The minute torque to be set in this step is previously stored in a minute torque map, and changes according to rotational speed of the electric motor 6, for example, as illustrated in FIG. 5.

In FIG. 5, there are provided two kinds of minute torques having positive and negative values. The positive minute torque is used when the electric motor 6 is operated as a motor, whereas the negative minute torque is used when the electric motor 6 is operated as a generator. According to the present embodiment, the positive minute torque and the negative minute torque are symmetrical to each other across a horizontal axis of FIG. 5. The positive minute torque and the negative minute torque are gradually increased in absolute values along with an increase in the rotational speed of the electric motor 6 until the torques reach a rotational speed N1 near the idle revolution of the engine 2. In a range where the rotational speed of the electric motor 6 is N1 or more, the positive minute torque and the negative minute torque are steady values Tr and −Tr, respectively.

A maximum value of the absolute value of the minute torque, or Tr, is set to, for example, 5N·m as a value that is smaller than an absolute value of the torque required in the electric motor 6 during the forced charge or discharge of the battery 18 and has no substantial affect on the operation of the vehicle. The minute torque has a value that is slightly larger than a minimum torque required when the electric motor 6 is rotated by external control in a state where the electric motor 6 is not conducted.

In Step S15, the electric motor 6 is operated as a generator to perform the minute power generation by making the electric motor 6 generate the negative minute torque. As a result, the SOC of the battery 18 is gradually increased.

The procedure advances to Step S16, in which a value of Flag F4 is set to 1. Flag F4 indicates whether to suspend a minute discharge of the battery 18, which will be described below. Flag F4 indicates the suspension of the minute discharge when the value thereof is 1, and indicates a continuation of the minute discharge when the value thereof is zero. At this point of time, the minute discharge is not necessary since the minute power generation is being carried out by the procedure of Step S15. Therefore, the value of Flag F4 is set to 1, and the procedure proceeds to Step S17.

In Step S17, the inverter ECU 26 reads from the vehicle ECU 22 the present SOC of the battery 18, which has been detected by the battery ECU 28. It is then judged whether the present SOC is larger than SOCi+0.8 percent. If the increase of the SOC which is caused by the minute power generation is not sufficient, and the present SOC is equal to or less than the SOCi+0.8 percent, the procedure moves to Step S18, in which the value of Flag F3 is set to zero. In this manner, the SOC retention control in the present control cycle is ended.

Flag F3 indicates whether to stop the minute power generation. Flag F3 indicates the suspension of the minute power generation when the value thereof is 1. When the value of Flag F3 is zero, it indicates the continuation of the minute power generation. If, in Step S16, it is judged that the present SOC is equal to or less than the SOCi+0.8 percent, it is considered that the minute power generation is still necessary, so that the value of Flag F3 is set to zero.

In Step S10 of the subsequent control cycle, the inverter ECU 26 makes a judgment again as to whether the value of Flag F1 is 1. The value of Flag F1 has already been set to 1 in Step S12 in the previous control cycle. The procedure subsequently advances to Step S21.

In Step S21, it is judged whether the value of Flag F2 is 1. The value of Flag F2 has been set to 1 in Step S14 in the previous control cycle, so that the procedure moves to Step S22.

In Step S22, it is judged whether the value of Flag F3 is 1. Since the minute power generation is still necessary as mentioned, the value of Flag F3 is zero at this moment. The procedure moves to Step S15 in this case.

In Step S15, the inverter ECU 26 continues to make the electric motor 6 generate the negative minute torque in the above-mentioned manner. Consequently, the electric motor 6 is operated as a generator to carry out the minute power generation. As a result, the SOC of the battery 18 is continuously increased by degree.

In this way, the control of the minute power generation of the electric motor 6 in Step S15 is continued until it is judged in Step S17 that the SOC of the battery 18 is larger than the SOCi+0.8 percent.

When the procedure advances to Step S17, and it is judged that the SOC of the battery 18 is larger than the SOCi+0.8 percent, the procedure moves to Step S19. In Step S19, the inverter ECU 26 stops the minute power generation of the electric motor 6. In short, the inverter ECU 26 controls the inverter 20 so that the torque of the electric motor 6 becomes zero.

In the subsequent Step S20, the value of Flag F3 is set to 1 since the minute power generation is suspended. The SOC retention control in the present control cycle is ended.

In the next control cycle, the procedure moves again from Step S10 through Step S21 to Step S22. It is then judged whether the value of Flag F3 is 1.

The value of Flag F3 has been set to 1 along with the suspension of the minute power generation in Step S20 in the previous control cycle. Therefore, the procedure advances to Step S23.

In Step S23, the inverter ECU 26 reads from the vehicle ECU 22 the present SOC of the battery 18, which has been detected by the battery ECU 28. A judgment is made as to whether the present SOC is reduced lower than the SOCi that is the SOC of the battery 18 at the time point when the SOC retention control is started.

Along with the suspension of the minute power generation of Step S19, the inverter ECU 26 controls the inverter 20 so that the torque of the electric motor 6 becomes zero. In this case, too, very small amount of current flows between the electric motor 6 and the battery 18 as stated above. For this reason, there is the possibility that the SOC of the battery 18 is reduced again. Therefore, it is judged in Step S23 whether the present SOC of the battery 18 is reduced lower than the SOCi.

If, in Step S23, it is judged that the present SOC of the battery 18 is reduced lower than the SOCi, the procedure proceeds to Step S15 again, in which the minute power generation is performed. The subsequent procedure is as described above.

If, in Step S23, it is judged that the present SOC of the battery 18 is equal to or larger than the SOCi, the procedure moves to Step S24. In Step S24, the inverter ECU 26 makes a judgment as to whether the present SOC of the battery 18 is larger than SOCi+1.6 percent.

If the present SOC of the battery 18 is not larger than the SOCi+1.6 percent, the procedure advances to Step S25, in which it is judged whether the value of Flag F4 is 1. Since the value of Flag F4 has been set to 1 in Step S16 in the previous control cycles, the present control cycle is ended here.

In the subsequent control cycle, the procedure moves again through Steps S10, S21 and S22 to Step S23. A judgment is made as to whether the present SOC of the battery 18 is reduced lower than the SOCi. If, in Step S23, it is judged that the present SOC of the battery 18 is reduced lower than the SOCi, the procedure moves to Step S15 again, and the minute power generation is carried out. If the present SOC of the battery 18 is equal to or larger than the SOCi, the procedure proceeds to Step S24. If the present SOC of the battery 18 is not larger than the SOCi+1.6 percent, the procedure ends the present control cycle after passing through Step S25.

If the SOCi that is the SOC of the battery 18 at the time point when the SOC retention control is started is less than 50 percent, the inverter ECU 26 operates the electric motor 6 as a generator and makes the electric motor 6 generate the negative minute torque until the SOC of the battery 18 reaches the SOCi+0.8 percent. By so doing, the electric motor 6 performs the minute power generation, and the battery 18 is charged.

Once the SOC of the battery 18 exceeds the SOCi+0.8 percent, the inverter ECU 26 stops the minute power generation. If the SOC of the battery 18 is reduced lower than the SOCi afterwards, the inverter ECU 26 causes the electric motor 6 to perform the minute power generation again, to thereby charge the battery 18.

If the inverter ECU 26 stops the minute power generation in Step S19, even if the control is carried out so that the torque of the electric motor 6 becomes zero, there flows very small amount of current between the electric motor 6 and the battery 18. There is the possibility that the SOC of the battery 18 is reduced again as mentioned above. Moreover, the current does not always flow in a direction that the battery 18 is discharged. In some cases, there is the possibility that the current flows in an opposite direction, namely in a direction of flowing from the electric motor 6 to the battery 18. In this case, the SOC of the battery 18 is gradually increased.

Under such assumption, it is judged in Step S24 whether the present SOC of the battery 18 is larger than the SOCi+1.6 percent. In other words, in case that, after the suspension of the minute power generation, the SOC of the battery 18 is increased while the inverter ECU 26 carries out the control so that the torque of the electric motor 6 becomes zero, and it is judged in Step S24 that the present SOC of the battery 18 is larger than the SOCi+1.6 percent, the procedure advances to Step S26.

In Step S26, the inverter ECU 26 sets the minute torque for operating the electric motor 6 as a motor. The inverter ECU 26 controls the inverter 20 so that the electric motor 6 generates this minute torque, and performs the minute discharge of the battery 18.

As stated above, the minute torque that is set at this time is previously stored in the minute torque map according to the rotational speed of the electric motor 6 so as to have, for example, the relationship shown in FIG. 5. In this case, the positive minute torque is used.

The inverter ECU 26 controls the electric motor 6 to generate the positive minute torque in Step S25, so that the electric motor 6 receives power supply from the battery 18 to operate as a motor. Since the minute discharge is carried out in this manner, the SOC of the battery 18 is reduced by degree.

In Step S27, the value of Flag F4 is set to zero since the minute discharge is required. In Step S28, a judgment is made as to whether the present SOC of the battery 18 is less than the SOCi+0.8 percent. If the SOC of the battery 18 is still equal to or larger than the SOCi+0.8 percent even after the minute discharge is carried out in Step S26, the present control cycle is ended. In the subsequent control cycle, the procedure starts from Step S10 again.

In this case, too, the procedure advances from Step S10 through Steps S21, S22 and S23 to Step S24. It is then judged whether the present SOC of the battery 18 is larger than the SOCi+1.6 percent.

If the present SOC of the battery 18 is equal to or less than the SOCi+1.6 percent due to the minute discharge performed in Step S26 in the previous control cycle, the procedure moves to Step S25, in which it is judged whether the value of Flag F4 is 1. Since the value of Flag F4 has been set to zero in the previous control cycle at this point, the procedure proceeds to Step S26. In Step S26, the minute discharge of the battery 18 is performed again in the above-described manner.

After the value of Flag F4 is maintained to zero in Step S27, the inverter ECU 26 makes a judgment in Step S28 as to whether the present SOC of the battery 18 is less than the SOCi+0.8 percent.

Likewise in case that the present SOC of the battery 18 is still larger than the SOCi+1.6 percent even after the minute discharge is performed in Step S26 in the previous control cycle, the procedure moves to Step S26. Again in the foregoing manner, the minute discharge of the battery 18 is carried out. In Step S28, it is judged whether the present SOC of the battery 18 is less than the SOCi+0.8 percent after the value of Flag F4 is continuously maintained to zero in Step S27.

Accordingly, if, in Step S24, it is judged that the present SOC of the battery 18 is larger than the SOCi+1.6 percent, the minute discharge of the battery 18 is carried out by the procedure of Step S26 until it is determined in Step S28 that the present SOC of the battery 18 is less than the SOCi+0.8 percent.

When it is determined in Step S28 that the present SOC of the battery 18 is less than the SOCi+0.8 percent after the minute discharge performed by the procedure of Step S26 is repeated, the procedure advances to Step S29. In Step S29, the inverter ECU 26 stops the minute discharge carried out by the motor operation of the electric motor 6. Therefore, the inverter ECU 26 controls the inverter 20 so that the torque of the electric motor 6 becomes zero.

In Step S30, the value of Flag F4 is set to 1 since the minute discharge is stopped, and the present control cycle is ended.

In the next control cycle, the procedure moves from Step S10 through Steps S21 and S22 to Step S23. In Step S23, the inverter ECU 26 makes a judgment as to whether the present SOC of the battery 18 is less than the SOCi. If the present SOC of the battery 18 is less than the SOCi, the procedure proceeds to Step S15. The inverter ECU 26 implements the minute power generation of the electric motor 6 in the foregoing manner. Details of the control in this case are as described above.

If the present SOC of the battery 18 is equal to or larger than the SOCi, the procedure advances to Step S24, in which it is judged whether the present SOC of the battery 18 is larger than the SOCi+1.6 percent. If the SOC of the battery 18 is equal to or less than the SOCi+1.6 percent, the procedure moves to Step S25, in which the inverter ECU 26 makes a judgment as to whether the value of Flag F4 is 1. At this point of time, the value of Flag F4 has already been set to 1 in the previous control cycle, so that the present control cycle is ended.

In the subsequent control cycles, too, the procedure repeats Steps S10, S21, S22, S23, S24 and S25 until it is judged in Step S24 that the present SOC of the battery 18 is larger than the SOCi+1.6 percent. As a result, the inverter ECU 26 controls the inverter 20 so that the torque of the electric motor 6 becomes zero. Details of the control that is implemented in case that the inverter ECU 26 judges in Step S24 that the present SOC of the battery 18 is larger than the SOCi+1.6 percent are as described above.

As mentioned above, if the SOCi that is the SOC at the time point when the SOC retention control is started is less than 50 percent that is a medium value of the predetermined allowable range (30 to 70 percent) in which the forced charge and discharge of the battery 18 are not required, the minute power generation and the minute discharge are carried out by the SOC retention control so that the SOC of the battery 18 falls between the SOCi+1.6 percent that is the maximum storage rate and the SOCi that is the minimum storage rate across the SOCi+0.8 percent that is the basic storage rate closer to the medium value than the SOCi.

Accordingly, even if the state continues for long hours in which the torque required in the electric motor 6 by the vehicle ECU 22 is zero, the SOC of the battery 18 is satisfactorily maintained in the vicinity of the medium value of the predetermined allowable range (30 to 70 percent) in which the forced charge and discharge are not required.

The value of 0.8 percent that is control width between the basic SOC and the maximum storage rate and also control width between the minimum storage rate and the basic SOC is a value twice or more than twice SOC detection resolution that the battery ECU 28 has. In other words, when transmitting the detection result of the SOC of the battery 18 to the vehicle ECU 22, the battery ECU 28 indicates the value of the SOC while changing the value in 256 steps for convenience of communication capacity. As a result, the detection resolution of the SOC becomes about 0.39 percent. The control width of the SOC retention control is 0.8 percent, which is twice or more than twice the detection resolution of the SOC.

The control width as described makes it possible to precisely catch a fluctuation of the SOC of the battery 18 and to control the SOC with accuracy. In addition, it is also possible to prevent the hunting that is caused by proximity of the control width of the SOC retention control to the SOC detection resolution.

The following description is about the SOC retention control in case that the inverter ECU 26 judges in Step S13 that the SOC of the battery 18 at the time point when the SOC retention control is started is equal to or more than 50 percent that is the medium value of the predetermined allowable range (30 to 70 percent) in which the forced charge and discharge of the battery 18 are not required.

In the initial control cycle from the time point when the SOC retention control is started, the procedure moves from Step S10 through Steps S11 and S12 to Step S13 of FIG. 3 as stated above. If it is judged that the SOCi, which is the SOC of the battery 18 at the time point when the SOC retention control is started and has been read in Step S11, is equal to or more than 50 percent, the procedure proceeds to Step S31 of FIG. 4.

In Step S31, the value of Flag F2 is set to zero since the SOCi is equal to or more than 50 percent. The procedure then advances to Step S32.

In Step S32, the inverter ECU 26 sets the positive minute torque for the motor operation of the electric motor 6 as in Step S26 of FIG. 3 by reading out the positive minute torque from the minute torque map as shown in FIG. 5. The inverter ECU 26 controls the inverter 20 so that the electric motor 6 generates the minute torque to perform the minute discharge of the battery 18.

Since the inverter ECU 26 causes the electric motor 6 to generate the positive minute torque in Step S32, the electric motor 6 receives the power supply from the battery 18 and is operated as a motor. This minute discharge reduces the SOC of the battery 18 by degree.

In Step S33, since the minute discharge is being carried out, and the minute power generation is not necessary, the value of Flag F3 is set to 1. The procedure then moves to Step S34.

In Step S34, the inverter ECU 26 reads from the vehicle ECU 22 the present SOC of the battery 18, which has been detected by the battery ECU 28. The inverter ECU 26 judges whether the present SOC is smaller than SOCi−0.8 percent. If the reduction of the SOC by the minute discharge is not sufficient, and the present SOC is equal to or larger than the SOCi−0.8 percent, the procedure advances to Step S29. Since the minute discharge is still required, the value of Flag F4 is set to zero, and the procedure of the present control cycle is ended.

In Step S10 of FIG. 3 of the subsequent control cycle, the inverter ECU 26 judges whether the value of Flag F1 is 1. The value of Flag F1 has already been set to 1, so that the procedure proceeds to Step S21.

In Step S21, the inverter ECU 26 makes a judgment as to whether the value of Flag F2 is 1. The value of Flag F2 has been set to zero in Step S31 of FIG. 4 in the previous control cycle. Therefore, the procedure advances to Step S38 of FIG. 4.

It is judged in Step S38 whether the value of Flag F4 is 1. Since the minute discharge is still necessary as mentioned, the value of Flag F4 is zero. Therefore, the procedure moves to Step S32.

In Step S32, the inverter ECU 26 continues to cause the electric motor 6 to generate the positive minute torque as stated. The electric motor 6 is operated as a motor, and the minute discharge is carried out. Simultaneously, the SOC of the battery 18 is continuously decreased by degree.

In this way, the control of the minute discharge by the procedure of Step S32 continues until the inverter ECU 26 judges in Step S34 that the SOC of the battery 18 is smaller than the SOCi−0.8 percent.

When the inverter ECU 26 judges in Step S34 that the SOC of the battery 18 is smaller than the SOCi−0.8 percent, the procedure proceeds to Step S36. In Step S36, the inverter ECU 26 stops the minute discharge carried out by the motor operation of the electric motor 6. Accordingly, the inverter ECU 26 controls the inverter 20 so that the torque of the electric motor 6 becomes zero.

In Step S37, the value of Flag F4 is set to 1 since the minute discharge has been suspended. The procedure of the present control cycle is ended.

In the next control cycle, the procedure advances from Step S10 through Step S21 to Step S38. In Step S38, it is judged whether the value of Flag F4 is 1.

The value of Flag F4 has been set to 1 along with the suspension of the minute discharge in Step S37 in the previous control cycle. The procedure therefore advances to Step S39.

In Step S39, the inverter ECU 26 reads from the vehicle ECU 22 the present SOC of the battery 18, which has been detected by the battery ECU 28. The inverter ECU 26 makes a judgment as to whether the present SOC is larger than the SOCi that is the SOC of the battery 18 at the time point when the SOC retention control is started.

Along with the suspension of the minute discharge in Step S36, the inverter ECU 26 controls the inverter 20 so that the torque of the electric motor 6 becomes zero. In this case, too, there flows very small amount of current between the electric motor 6 and the battery 18. This raises the possibility that the SOC of the battery 18 is increased again. Therefore, in Step S39, it is judged whether the present SOC of the battery 18 is larger than the SOCi.

If, in Step S39, it is judged that the present SOC of the battery 18 is larger than the SOCi, the procedure advances to Step S32, in which the inverter ECU 26 carries out the minute discharge. The subsequent procedure is as described above.

If, in Step S39, it is judged that the present SOC of the battery 18 is equal to or smaller than the SOCi, the procedure proceeds to Step S40. It is judged in Step S40 whether the present SOC of the battery 18 is lower than SOCi−1.6 percent.

If the present SOC of the battery 18 is not lower than the SOCi−1.6 percent, the procedure moves to Step S41, in which it is judged whether the value of Flag F3 is 1. Since the value of Flag F3 has been set to 1 in Step S33 in the previous control cycles, the procedure of the present control cycle is ended.

In the next control cycle, the procedure proceeds to Step S39 after passing through Steps S10, S21 and S38. It is then judged whether the present SOC of the battery 18 is larger than the SOCi. If, in Step S39, it is judged that the present SOC of the battery 18 is larger than the SOCi, the procedure moves to Step S32 again to perform the minute discharge.

If the present SOC of the battery 18 is equal to or smaller than the SOCi, the procedure advances to Step S40. If the present SOC of the battery 18 is not lower than the SOCi−1.6 percent, the procedure of the control cycle is ended after passing through Step S41.

If the SOCi that is the SOC of the battery 18 at the time point when the SOC retention control is started is equal to or larger than 50 percent, the inverter ECU 26 operates the electric motor 6 to make the electric motor 6 generate the positive minute torque until the SOC of the battery 18 is reduced to the SOCi−0.8 percent. By so doing, the minute discharge of the battery 18 is carried out.

Once the SOC of the battery 18 is reduced lower than the SOCi−0.8 percent, the inverter ECU 26 stops the minute discharge. If the SOC of the battery 18 exceeds the SOCi afterwards, the minute discharge of the battery 18 is performed again.

In case that the inverter ECU 26 stops the minute discharge in Step S36, there flows very small amount of current between the electric motor 6 and the battery 18 even if the control is carried out so that the torque of the electric motor 6 becomes zero. The current flows from the battery 18 to the electric motor 6 in some cases, so that there is the possibility that the SOC of the battery 18 is reduced.

Under such assumption, it is judged in Step S40 whether the present SOC of the battery 18 is lower than the SOCi−1.6 percent. In other words, in case that, after the minute discharge is suspended, the SOC of the battery 18 is reduced while the inverter ECU 26 carries out the control so that the torque of the electric motor 6 becomes zero, and Step S40 judges that the present SOC of the battery 18 is lower than the SOCi−1.6 percent, the procedure advances to Step S42.

In Step S42, the inverter ECU 26 reads out the negative minute torque for the generator operation of the electric motor 6 from the minute torque map of FIG. 5 to set the negative minute torque as in Step S15 of FIG. 3. The inverter ECU 26 controls the inverter 20 so that the electric motor 6 generates this minute torque.

In Step S42, the inverter ECU 26 causes the electric motor 6 to generate the negative minute torque as mentioned. As a result, the electric motor 6 is operated as a generator to perform the minute power generation. Consequently, the SOC of the battery 18 is gradually increased.

In Step S43, since the minute power generation is required, the value of Flag F3 is set to zero. In the subsequent Step S44, the inverter ECU 26 judges whether the present SOC of the battery 18 is larger than the SOCi−0.8 percent. If the SOC of the battery 18 is still equal to or smaller than the SOCi−0.8 percent after the minute power generation is performed in Step S42, the present control cycle is ended. In the next control cycle, the procedure is started again from Step S10.

In this case, too, the procedure moves from Step S10 through Steps S21, S38 and S39 to Step S40. It is then judged whether the present SOC of the battery 18 is lower than the SOCi−1.6 percent.

If the present SOC of the battery 18 is equal to or larger than the SOCi−1.6 percent due to the minute power generation performed in Step S42 in the previous control cycle, the procedure advances to Step S41. In Step S41, a judgment is made as to whether the value of Flag F3 is 1. Since the value of Flag F3 has been set to zero in the previous control cycle, the procedure moves to Step S42. In Step S42, the minute power generation is carried out as stated.

After the value of Flag F3 is continuously maintained to zero in Step S43, a judgment is made in Step S44 as to whether the present SOC of the battery 18 has become larger than the SOCi−0.8 percent.

If the present SOC of the battery 18 is still lower than the SOCi−1.6 percent after the minute power generation is performed in Step S42 in the previous control cycle, the procedure moves to Step S42. In Step S42, the minute power generation is carried out again as mentioned. After the value of Flag F3 is continuously maintained to zero in Step S43, a judgment is made in Step S44 as to whether the present SOC of the battery 18 has become larger than the SOCi−0.8 percent.

If, in Step S40, it is judged that the present SOC of the battery 18 is lower than the SOCi−1.6 percent, the minute power generation by the procedure of Step S42 is performed until it is judged in Step S44 that the present SOC of the battery 18 is larger than the SOCi−0.8 percent.

The minute power generation by the procedure of Step S42 is repeated in this way. When it is judged in Step S44 that the present SOC of the battery 18 is larger than the SOCi−0.8 percent, the procedure advances to Step S45. In Step S45, the inverter ECU 26 stops the minute power generation carried out by the generator operation of the electric motor 6. Accordingly, the inverter ECU 26 controls the inverter 20 so that the torque of the electric motor 6 becomes zero.

In the subsequent Step S46, the value of Flag F3 is set to 1 since the minute power generation has been suspended. The procedure of the present control cycle is then ended.

In the next control cycle, the procedure moves from Step S10 through Steps S21 and S38 to Step S39. It is judged whether the present SOC of the battery 18 has become larger than the SOCi. If the present SOC of the battery 18 is larger than the SOCi, the procedure proceeds to Step S32, and the minute discharge is performed as stated above. Details of the control in this case are as already described.

If the present SOC of the battery 18 is equal to or smaller than the SOCi, the procedure moves to Step S40. In Step S40, the inverter ECU 26 makes a judgment as to whether the present SOC of the battery 18 is smaller than the SOCi−1.6 percent. If the present SOC of the battery 18 is equal to or larger than the SOCi−1.6 percent, it is judged in Step S41 whether the value of Flag F3 is 1. Since the value of Flag F3 has already been set to 1 in the previous control cycle, the procedure of the present control cycle is ended.

In the subsequent control cycle, too, the procedure repeats Steps S10, S21, S38, S39, S40 and S41 until it is judged in Step S40 that the present SOC of the battery 18 is smaller than the SOCi−1.6 percent. To be brief, the inverter 20 is controlled by the inverter ECU 26 so that the torque of the electric motor 6 becomes zero. Details of the control that is implemented when it is judged in Step S40 that the present SOC of the battery 18 is smaller than the SOCi−1.6 percent are as already described above.

If the SOCi that is the SOC at the time point when the SOC retention control is started is equal to or larger than 50 percent that is the medium value of the predetermined allowable range (30 to 70 percent) in which the forced charge and discharge of the battery 18 are not required, the minute power generation and the minute discharge are carried out by the SOC retention control so that the SOC of the battery 18 falls between the SOCi that is the maximum storage rate and the SOCi−1.6 percent that is the minimum storage rate across the SOCi−0.8 percent that is the basic storage rate closer to the medium value than the SOCi.

Even if the state continues for a long period of time in which the torque required in the electric motor 6 by the vehicle ECU 22 is zero, the SOC of the battery 18 is satisfactorily maintained in the vicinity of the medium value of the predetermined allowable range (30 to 70 percent) in which the forced charge and discharge are not necessary.

The value of 0.8 percent that is the control width between the basic SOC and the maximum storage rate and also the control width between the minimum storage rate and the basic SOC is a value twice or more than twice the SOC detection resolution that the battery ECU 28 has. Therefore, it is possible to precisely catch a fluctuation of the SOC of the battery 18 and to control the SOC with accuracy. It is also possible to prevent the hunting that is caused by proximity of the control width to the SOC detection resolution.

Since the inverter ECU 26 carries out the SOC retention control in the above-mentioned manner, even if the state continues for long hours in which the torque required in the electric motor 6 by the vehicle ECU 22 is zero, the SOC of the battery 18 is maintained in the vicinity of the SOCi that is the SOC at the time point when the SOC retention control is started, and more precisely in the vicinity of the basic storage rate that is closer to the medium value of the predetermined allowable range (30 to 70 percent) in which the forced charge and discharge are not necessary than the SOCi. This makes it possible to prevent useless current from flowing between the electric motor 6 and the battery 18 and therefore to prevent wasteful consumption of the kinetic energy of the electric motor 6 and the electric energy of the battery 18. In addition, since the forced charge and discharge are reduced in frequency, the energy efficiency is improved, and fuel economy is enhanced. Consequently, the life duration of the battery 18 is extended.

The minute torque generated by the electric motor 6 during the SOC retention control is minutely small as compared to the torque required for the forced charge and discharge. Therefore, the SOC retention control can be carried out without affecting the running of the vehicle.

According to whether the SOC of the battery 18 at the time point when the SOC retention control is started is equal to or larger than 50 percent that is the medium value of the predetermined allowable range (30 to 70 percent) in which the forced charge and discharge are not necessary, the inverter ECU 26 determines whether to activate the electric motor 6 as a motor or generator. The minute torque is set depending upon a determination result. This makes it possible to retain the SOC of the battery 18 in a proper range. Consequently, even if the start and end of the SOC retention control are repeated in relatively short cycles, the SOC of the battery 18 can be retained in the vicinity of the basic storage rate that is closer to the medium value than the SOCi that is SOC at the time point when the SOC retention control is started.

Although the description of the control system for a hybrid electric vehicle according to one embodiment of the present invention has been finished, the present invention is not limited to the above-described embodiment.

For instance, in the above embodiment, the inverter ECU 26 determines whether to activate the electric motor 6 as a motor or generator according to whether the SOC of the battery 18 at the time point when the SOC retention control is started is equal to or larger than 50 percent. The minute torque is set according to a determination result. However, whether to activate the electric motor 6 as a motor or generator may be determined without using the SOC of the battery 18 at the time point when the SOC retention control is started.

In other words, the SOC retention control is implemented every time the vehicle is brought into the preset zero torque condition. It may be determined as to whether to activate the electric motor 6 as a motor or generator in the present SOC retention control, based upon whether the minute power generation or the minute discharge has been carried out at the last in the previous SOC retention control.

In this case, it is also possible to store the value of Flag F2 which has been determined at the last in Step S14 of FIG. 3 or in Step S24 of FIG. 4 in the previous SOC retention control until the present SOC retention control, and to judge the value of Flag F2 in Step S13 when the present SOC retention control is started.

If the value of Flag F2 is 1, that is, if the minute power generation has been carried out at the last in the previous SOC retention control, the procedure advances to Step S24. The inverter ECU 26 may start the present SOC retention control with the minute discharge. If the value of Flag F2 is zero, that is, if the minute discharge has been carried out at the last in the previous SOC retention control, the procedure proceeds to Step S14. The inverter ECU 26 may start the present SOC retention control with the minute power generation.

By so doing, even if the SOC retention control is performed again and again, there is no possibility that only either the generator operation or motor operation of the motor is repeated. As a result, the battery storage rate can be stably maintained virtually constant.

In the above embodiment, the control width of the SOC retention control is 0.8 percent. However, this is one example, and the control width is not limited to 0.8 percent. Preferably, the control width may be twice or more than twice the SOC detection resolution that the battery ECU 28 has.

In the above embodiment, when a determination is made as to whether to activate the electric motor 6 as a motor or generator according to the SOCi that is the SOC of the battery 18 at the time point when the SOC retention control is started, the value of 50 percent is used as a judgment value that is the medium value of the predetermined allowable range in which the forced charge and discharge are not necessary. However, the judgment value is not limited to 50 percent. It is possible to properly change the judgment value according to the predetermined allowable range.

Although, in the above embodiment, the electric motor 6 is disposed in between the clutch 4 and the transmission 8, the disposition of the electric motor 6 is not limited to this. The electric motor 6 may be placed, for example, in between the engine 2 and the clutch 4. The vehicle may be a hybrid electric vehicle that drives the driving wheels simply by using the motor, and uses the engine as a driving source for operating the motor as a generator, instead of a hybrid electric vehicle in which the driving force of the engine 2 and that of the electric motor 6 are transmittable to the driving wheels.

Although the engine 2 is a diesel engine in the above embodiment, the type of the engine is not limited to this, and it may be a gasoline engine.

In the above embodiment, the transmission 8 is an automatic transmission. However, the type of the transmission is not limited to this, and it may be a manual transmission.

Although the electric motor 6 is a permanent-magnetic synchronous motor in the above embodiment, the type of the electric motor 6 is not limited to this. A motor of any type can properly retain the SOC of the battery 18 as well by performing the SOC retention control as long as the motor is applicable to a hybrid electric vehicle.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A control system for a hybrid electric vehicle equipped with an engine and an electric motor, comprising:
   a battery that supplies power to the electric motor when the electric motor is operated as a motor, and can be charged with power generated by the electric motor when the electric motor is operated as a generator;
   storage-rate detection means for detecting a storage rate of the battery;
   motor judgment means for making a judgment as to whether the vehicle is in a preset state where torque required in the electric motor is zero; and
   storage-rate control means implementing storage-rate retention control for retaining the storage rate of the battery, the control in which the storage-rate control means controls the electric motor to perform a forced charge or discharge of the battery when the storage rate of the battery, which is detected by the storage-rate detection means, is out of a predetermined allowable range, and causes the electric motor to generate a minute torque when the motor judgment means judges that the vehicle is in the preset state, the minute torque having an absolute value that is smaller than the torque of the electric motor required for the forced charge or discharge.

2. The control system for a hybrid electric vehicle according to claim 1, wherein
   the motor judgment means judges that the vehicle is in the preset state when the torque required in the electric motor is zero, and the vehicle is in a preset operating state in which the use of the electric motor is not required.

3. The control system for a hybrid electric vehicle according to claim 1, wherein
   the storage-rate control means determines whether to activate the electric motor as the motor or as the generator according to the storage rate of the battery at a time point when the storage-rate retention control is started, and sets the minute torque according to a determination result.

4. The control system for a hybrid electric vehicle according to claim 1, wherein
   during the storage-rate retention control, the storage-rate control means adjusts the minute torque so as to retain the storage rate of the battery between a predetermined maximum storage rate and a predetermined minimum storage rate that are set across a basic storage rate closer to a medium value of the predetermined allowable range than the storage rate of the battery at a time point when the storage-rate retention control is started.

5. The control system for a hybrid electric vehicle according to claim 4, wherein
   the storage-rate control means sets a width between the basic storage rate and the predetermined maximum storage rate and a width between the basic storage rate and the predetermined minimum storage rate to be twice or more than twice a detection resolution of the storage-rate detection means.

6. The control system for a hybrid electric vehicle according claim 1, wherein
   the storage-rate control means implements the storage-rate retention control while switching the electric motor between the motor operation and the generator operation by adjusting the minute torque; and when starting the storage-rate retention control, if the electric motor has been operated as the motor at a time point when the previous storage-rate retention control is ended, the storage-rate control means sets the minute torque so that the electric motor is activated as the generator, and if the electric motor has been operated as the generator at the time point when the previous storage-rate retention control is ended, the storage-rate control means sets the minute torque so that the electric motor is activated as the motor.

* * * * *